June 29, 1965     R. E. HAYNES     3,192,338
MAXIMUM FAULT CURRENT LIMITING ELECTRICAL CIRCUIT-BREAKER
Filed July 24, 1962     2 Sheets-Sheet 1
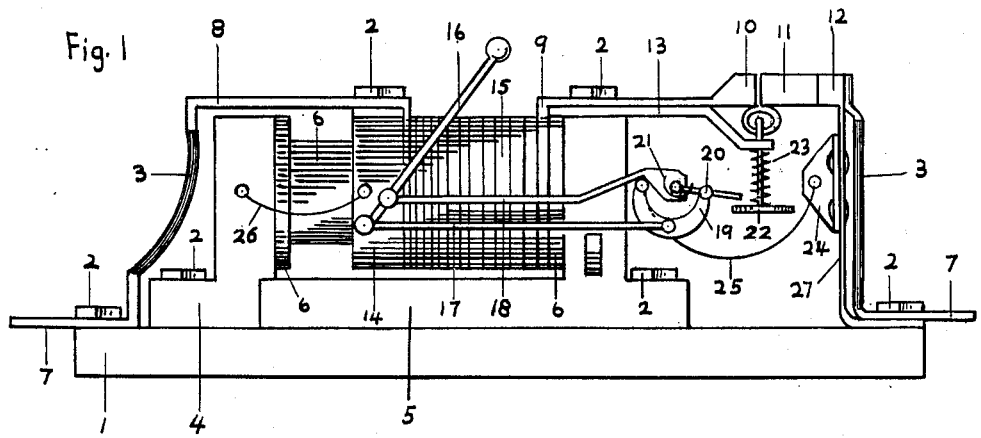
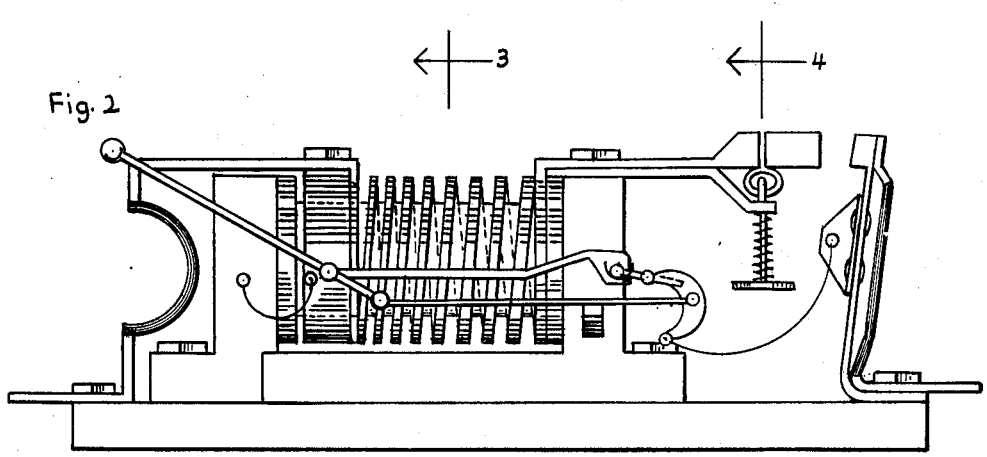
INVENTOR.
BY Robert Haynes

INVENTOR.

BY *Robert Haynes*

United States Patent Office 3,192,338
Patented June 29, 1965

3,192,338
MAXIMUM FAULT CURRENT LIMITING
ELECTRICAL CIRCUIT-BREAKER
Robert E. Haynes, 1925 Mill Road, South Pasadena, Calif.
Filed July 24, 1962, Ser. No. 212,081
8 Claims. (Cl. 200—87)

This invention relates to an electrical circuit-breaker of the maximum fault type, having the ability to interrupt the maximum short-circuit fault current available for a given electrical power system.

The primary object of this invention is to provide an electrical circuit-breaker having built-in characteristics capable of limiting the maximum short-circuit fault current to a safe operating level for which the circuit-breaker is designed for any given voltage of an electrical power system.

Another object of the invention is to provide an electrical circuit-breaker capable of being operated by personnel under short-circuit fault current wherein safety of operation will be assured against the circuit-breaker blowing up because of extreme heavy inrush of electrical current where such capabilities are present from the source of electrical utility.

With the foregoing and other objects in view which will appear as the discription proceeds, the invention consists of certain novel details of construction and combination of parts hereinafter more fully described and pointed out in the claims, it being understood that changes may be made in the construction and arrangement of parts without departing from the spirit of the invention as claimed.

Referring to the drawings;

FIGURE 1 is a longitudinal view of one side of the electrical circuit-breaker in the closed operating position.

FIGURE 2 is a longitudinal side view of the electrical circuit-breaker in the open position.

Figure 3:
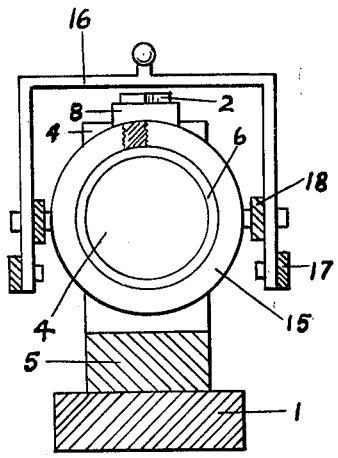
FIGURE 3 is a sectional view taken on line 3 of FIGURE 2.
Figure 4:
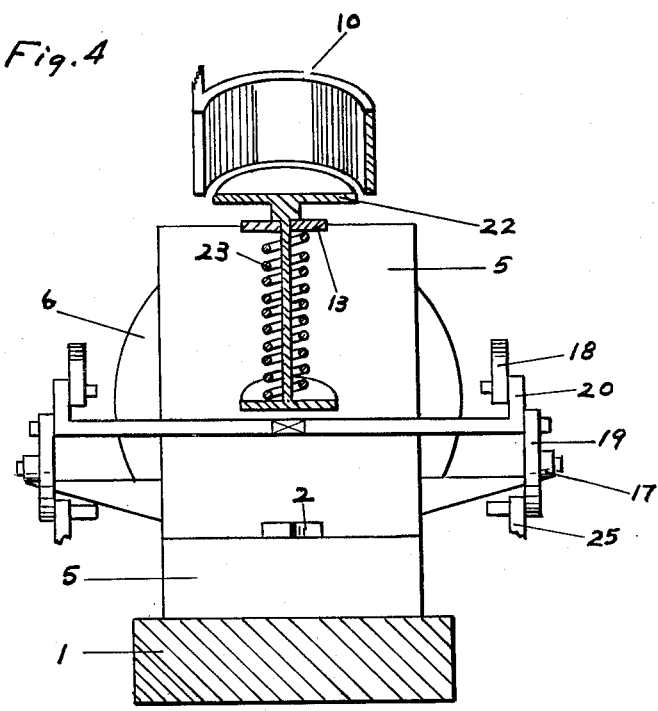
FIGURE 4 is a sectional view taken on line 4 of FIGURE 2.

Referring to the drawings in detail, the base or back supporting member is indicated generally by the reference character 1, all other parts being supported directly or indirectly thereon and the main electrical circuit path entering and leaving at the connections 7. The supporting member 1 is composed of an insulating material.

A laminated soft iron core body 5 is mounted upon the supporting member 1 by the bolt or cap screw 2. A matching end soft iron core body 4 is mounted upon the supporting member 1 by the cap screw 2 so as to form a continuous laminated iron body 5 and 4.

A round insulating or non-conducting collar and flanges 6 is mounted upon the longitudinal round laminated iron core body 5 and 4. The collar and flanges 6 is split in the middle section as desired so that parts may be assembled upon its surface.

A circuit conducting coil spring 15 is mounted between the flanges and upon the collar 6. The circuit coil spring 15 is joined to the circuit conducting rings and bars 8 and 9. The circuit conducting coil spring 15 is tapering in shape from one coil turn to the next coil turn, resulting in each coil turn being slightly thinner in thickness than the coil turn just ahead of it.

A movable insulating collar 14 is mounted over the sleeve collar 6. The circuit conducting bar 8 is mounted to the movable collar 14 by the use of a spacer washer and the cap screw 2. The circuit conducting bar 8 is joined by a flexible stranded conductor 3 which allows the conductor bar 8 to move back and forth with the operation of the circuit-breaker. The flexible stranded conductor cable 3 terminates at the left connector bar 7 and is held in place to the base member 1 by the cap screw 2.

The insulator spacer bar 13 and the circuit conductor bar 9 are held in place and fastened to the laminated iron body 5 by the cap screw 2. The circuit conductor bar 9 is formed into a one turn loop to form the round circle and gap shown between the points 10 and 11. The end of the conductor bar 9 terminates and forms one half of the circuit-breaker contacts at the bar end 11.

The movable or operating circuit contact 12 is fastened to a steel spring bar 27 which has a tendency to hold the contact 12 apart from the opposite circuit contact 11. A flexible stranded conductor cable 3 joins the circuit contact 12 to the connection bar 7 by the cap screw 2. An insulating fastening bar or brace 24 is riveted to the steel spring bar 27.

The steel spring 26 has a tendency to hold the movable collar 14 to the left flange of the insulating collar 6. An operating handle and lever 16 is attached to the insulating movable collar 14 by pins anchored in the sides of the movable collar 14. Opening and closing levers 18 and 17 are hinged at one end to the operating lever 16. The trip lever 20 is hinged to the opening and closing lever 18. A steel spring 21 holds the trip lever 20 in a downward position against a small stop on the lever 18. The latching lever 19 is hinged to the trip lever 20. A steel spring 25 is hinged at one end to the latching lever 19 and at the other end to the fastening bar 24. A solenoid plunger 22 with its connecting shaft and cross bar, operates through a hole in the spacer bar 13. A weak steel spring 23 has a tendency to hold the solenoid plunger and stem 22 in a downward position.

From the foregoing it will be seen that due to the construction shown and described, that an electrical current, when the circuit-breaker is in the closed position as shown in the FIG. 1, can enter the connection bar 7 at the right hand side of the FIG. 1 and travel along the flexible conductor bar 3 to the circuit-breaker contact points 11 and 12. At the contact point 11 the conductor bar and electric current makes a loop around the solenoid plunger 22 to the point 10 of the conductor bar 9. From the conductor bar 9 the electric current travels by pressure contact straight across from one coil spring loop to the next coil spring loop without having to circle around the entire coil spring loop. When the circuit-breaker is in the closed position, the steel spring 25 holds the loops of the circuit coil spring 15 tightly together, forming a straight across pressure contact between each loop of the coil spring 15, thereby cutting out the resistance of each loop of the coil spring 15. The electric current continues to travel straight across the contact to contact loops of the coil spring 15 and travels out the conductor bar 8 to the flexible cable 3 to the loadside line connector bar 7.

When a heavy overload or a complete dead-short comes on the branch-circuit conductors, the heavy inrush of electric current through the conductor bar loop at the points 10 and 11 will cause the solenoid plunger 22 to pull up the solenoid stem and cross bar which will contact the trip lever 20 raising the trip bar 20 past the dead-center line of pull being exerted by the steel spring 25, thereby allowing the latching bar or lever 19 to trip out and release the entire pressure being exerted by the steel spring 25, which in turn allows the steel spring 27 to open the contact point 12 away from the contact point 11, causing the circuit-breaker to be in the open position as shown in the FIG. 2. The steel spring 27, which opens the breaker contact point 12, is weak compared to the coil spring 15 and in actual operation the coil spring 15 starts opening and expanding slightly ahead of the breaker contact points 11 and 12 thereby almost instantly providing an impedance path in the inductive coil spring 15 which will limit the abnormal short-circuit inrush current from jumping or bridging the separation gap or opening of the breaker contact points 11 and 12. When the circuit-breaker operates from an ordinary overload condition the breaker contact points 11 and 12 are capable of rupturing the electric current without damage to the breaker contact points 11 and 12, however, when the available short-circuit current is many times greater than the normal ability of the circuit-breaker to safely rupture, the short-circuit current will begin to build up to a tremendous value as the breaker contact points 11 and 12 open, but at this instance the inductive coil spring 15 has also opened and provided sufficient inductive impedance into the circuit path of the coil spring 15 to safely limit the short-circuit inrush current to a value that the breaker contact points 11 and 12 can safely rupture.

As the circuit-breaker trips to the open position, the circuit conducting coil spring 15 is released from a tight pressure contact between each loop of the coil spring, and as the coil spring 15 springs apart as shown in the FIG. 2, the heavy short-circuit current is forced to travel around the entire loop of the coil spring, as each loop of the coil spring, springs apart one loop from the other loop, one after the other, causing the resistance of each loop of the coil spring 15, one after the other, to be added to the circuit conducting path of the circuit-breaker thereby limiting the maximum fault short-circuit to the level for which the circuit breaker is designed.

When the circuit-breaker is operating on an alternating current circuit, an inductive reactance resistance will be created in the loops of the conducting coil spring 15, as each loop of the coil spring separates from physical contact with the next loop of the coil spring 15. The ohmic value of the inductive reactance created in the loops of the conducting coil spring 15 will be added to the fixed resistance of the full length of the coil spring 15. Further, when the conducting coil spring 15 is fully opened, as shown in FIG. 2, the loops of the coil spring 15 will, in part, act like a transformer coil connected into a circuit, thereby also creating a reverse electromotive force tending to oppose the heavy inrushes of short-circuit currents.

Also, as the steel spring 26 pulls the loops of the coil spring 15 to their maximum separation, the equalizing force between the steel spring 26 and the conducting coil spring 15, will cause the loops of the coil spring 15 to vibrate for an instance, which will cause a greater opposing reverse electromotive force to be created in the loops of the coil spring 15, which will further limit the maximum fault short-circuit current of the circuit-breaker path during the instance the circuit-breaker contacts 11 and 12 are separating.

The current circuit path coil spring 15 begin with thick heavy coil spring loops at the right hand side where it attaches to the circuit conductor bar 9, and each following loop of the coil spring 15, working toward the left handed side, becomes gradually thinner in thickness, until the last loop turn of the coil spring 15, where it attaches to the circuit conductor bar 8, is much thinner than the heavy first turn of the coil spring 15. As each loop of the coil spring 15 becomes thinner, gradually increasing the resistance of the coil conducting path, the expandable relief pressure of each loop of the coil spring 15, gradually becomes less and less from one coil spring loop turn to the next loop or turn of the coil spring 15. Since the expandable relief pressure is greater between the thicker and heavier loop turn of the coil spring 15, the expansion and separation of each loop turn of the coil spring 15 will be greater and quicker at the right hand end of the coil spring 15 where the thicker loops turns exist, and when the compressed coil spring 15 is released through the overload tripping action of the circuit-breaker, the thick or heavier turns of the coil spring 15 will gradually separate first from a physical side to side contact, and this gradual expansion and separation of one coil spring loop turn from the next succeeding loop turn will almost instantly take place, thereby almost instantly placing impedance in each coil spring turn, one after the other which in turn, will almost instantly instill or increase the resistance to the flow of electrical current through the loop turns of the coil spring 15 so as to limit the maximum fault short-circuit electrical current through the electrical conducting path of the circuit-breaker to the level or capacity for which the circuit-breaker was designed. The steel spring 26, which is hinged to anchor pins in the laminated iron body 4 and the movable collar 14, will cause the thinner and weaker loop turns of the coil spring 15 to fully expand and separate uniformly in spacing between the loop turns, as the coil spring 15 completes its expansion movement.

In the closing operation of the circuit-breaker, from the open position shown in FIG. 2, the operating lever 16 is moved to a forward position as shown in FIG. 1, and as the lever 16 moves forwardly, the closing lever 17 will pull the latching lever 19, which will pull the steel spring 25, which will pull the closing circuit contact 12 into position against the other circuit contact 11, this will place the entire resistance or impedance, where alternating electrical current is used, of the coil spring 15 into the electrical conducting path of the circuit-breaker. As the movement of the closing contact 12 stops against the opposite contact 11, the coordinating lever 18 and the movable collar 14 will move forward, causing the weaker or thinner loop turns of the coil spring 15, at the left side end, to close first, thereby gradually cutting out the resistance, or impedance, or both, as the loop turns gradually and successively make side to side physical contact from one loop turn to the next loop turn of the coil spring 15, until all of the loop turns of the coil spring 15 are tightly compressed against each other.

When the operating lever 16 and the collar 14 have moved forward enough to tightly compress all of the loop turns of the coil spring 15 against each other, the steel spring 25 will be further stretched to allow the latching lever 19 to close into a barely self locking position as shown in the FIG. 1. The self locking position of the latching lever 19 is accomplished as soon as the movement of the latching lever 19 passes the center line of force between the anchor pin hinge in the collar 14 for the operating lever 16, and the hinge pin in the bracing or fastening bar 24.

If, during the closing operation of the circuit-breaker, a dead short-circuit exist on the electrical circuit, the heavy inrushes of electrical current through the conducting path of the circuit-breaker will cause the solenoid stem and cross bar 22 to suddenly move upwardly and move the tipping lever 20 slightly past the center line of force, allowing the latching lever 19 to trip out, releasing all of the holding forces, thereby allowing the circuit-breaker to open, as shown in the FIG. 2.

Electrically speaking, in the closing operation of the circuit-breaker, all of the electrical characteristics of the electrical conducting circuit are in the reverse or opposite of the opening operation of the circuit-breaker.

What is claimed is:

1. In a maximum fault current limiting electrical circuit-breaker, the combination of a frame, breaker contacts and a compressible flexible coil spring, the breaker contact points attached to the flexible coil spring, the breaker contact points and the flexible coil spring together forming the electrical conducting path of the circuit-breaker, means for opening the circuit-breaker under overload, said means comprising latching levers between the movable breaker contact point and the opposite end of the compressible flexible coil spring, a solenoid plunger mounted between the breaker contact points and the flexible coil spring, said solenoid being actuated by the electrical current through the closed breaker contact points and the flexible coil spring, thereby causing the release of the latching levers, allowing the movable breaker contact point to open.

2. In a maximum fault current limiting electrical circuit-breaker, the combination of breaker contact points attached to and in series with one end of a flexible coil spring, lever means for compressing the flexible coil spring and holding said breaker contact points closed, means for opening the breaker contact points under overload, said means releasing the levers holding said compressed flexible coil spring, whereby the instant release and expansion of the flexible coil spring causes a high impedance path to the flow of electrical current in the flexible coil spring, thereby instantly limiting the maximum fault current at the breaker contact points.

3. An electrical actuated current limiting circuit-breaker, comprising a movable and fixed contact, a flexible coil spring, said fixed contact being attached to one end of said flexible coil spring, said contacts and said flexible coil spring forming a series circuit path, means for compressing said flexible coil spring and closing said contacts for normal circuit current operations, means for releasing and expanding said compressed flexible coil spring under abnormal circuit current operations, whereby the expansion of said flexible coil spring provides an impedance to said series circuit path.

4. An electrically actuated current-limiting circuit-breaker, the combination of a flexible coil spring, breaker contact points, a solenoid plunger, said flexible coil spring, breaker contact points and said solenoid plunger mounted in a series connection, said breaker contact points and said solenoid plunger mounted in a position to one end of said flexible coil spring, said breaker contact points mounted in a movable position, means for closing said breaker contact points and compressing said flexible coil spring, said means embodying levers attached to said breaker contact points and said flexible coil spring, said solenoid plunger being actuated by the current through said breaker contact points and said flexible coil spring, means whereby said solenoid plunger actuates the release of said flexible coil spring and said breaker contact points under abnormal circuit current operations.

5. An electrically actuated current-limiting circuit-breaker, comprising breaker contact points and a flexible coil spring, said breaker contact points being attached to one end of said flexible coil spring, said breaker contact points and said flexible coil spring forming a series circuit path, means for closing said breaker contact points and shunting each turn of the series circuit path through said flexible coil spring for normal circuit current operations, means for removal of said shunting of each turn of said flexible coil spring and opening of said breaker contact points for abnormal circuit current operations, whereby the removal of the shunting of each turn of the flexible coil spring provides an inductive impedance to said series circuit path.

6. An electrically actuated current-limiting circuit-breaker, comprising breaker contact points, a flexible coil spring, a laminated iron core mounted within said flexible coil spring, said breaker contact points mounted in series with said flexible coil spring, means for compressing said flexible coil spring and closing said breaker contact points for normal circuit current operations, means for releasing and expanding said flexible coil spring under abnormal circuit current operations, whereby the expansion of said flexible coil spring provides an instantly created inductive impedance to the flow of electrical current through said series circuit path.

7. In a maximum fault current-limiting electrical circuit-breaker, comprising the combination of breaker contact points, a flexible coil spring, a laminated iron core, said laminated iron core mounted within said flexible coil spring, said breaker contact points and said flexible coil spring connected to form a series circuit path, means for closing said breaker contact points and compressing said flexible coil spring for normal circuit current operations, means for releasing said flexible coil spring and opening said breaker contact points for abnormal circuit current operations.

8. In a electrically actuated current-limiting circuit-breaker, the combination of breaker contact points, a flexible coil spring, a laminated iron core, said laminated iron core mounted within said flexible coil spring, said breaker contact points and said flexible coil spring connected to form a series circuit path, means for closing said breaker contact points and compressing said flexible coil spring for normal circuit current operations, means for releasing said flexible coil spring and opening said breaker contact points for abnormal circuit current operations, whereby the exansion of said flexible coil spring provides an inductive impedance to said series circuit path.

References Cited by the Examiner
UNITED STATES PATENTS

| | | | |
|---|---|---|---|
| 532,838 | 1/95 | Thomson | 200—144 |
| 736,297 | 8/03 | Reed | 338—93 |
| 963,763 | 7/10 | Harris | 200—88 |
| 1,050,493 | 1/13 | Schweitzer et al. | 200—117 |
| 1,717,260 | 6/29 | Rankin | 317—11 |
| 2,007,760 | 7/35 | Hulse | 338—93 |
| 2,205,944 | 6/40 | Dunmire | 200—88 |
| 2,564,416 | 8/51 | Wildhack | 338—93 |
| 2,575,957 | 11/51 | Hines | 200—144 |
| 2,713,150 | 7/55 | Bearinger | 338—93 |

BERNARD A. GILHEANY, *Primary Examiner.*

ROBERT K. SCHAEFER, *Examiner.*